July 27, 1943.   H. HOOVER, JR., ET AL   2,325,057
MEANS FOR OBTAINING SOIL SAMPLES
Filed May 28, 1940   2 Sheets-Sheet 1
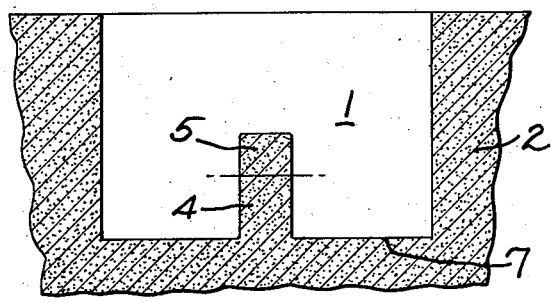
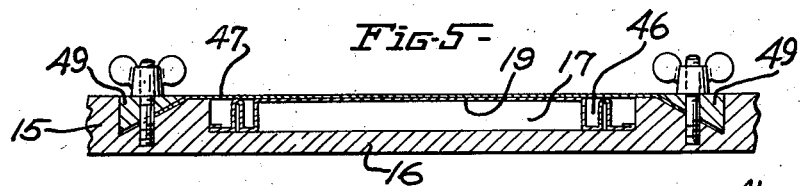
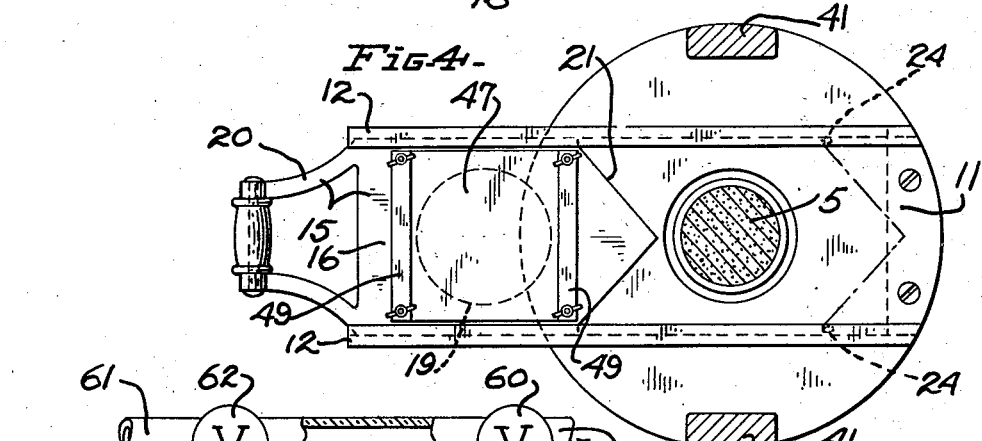
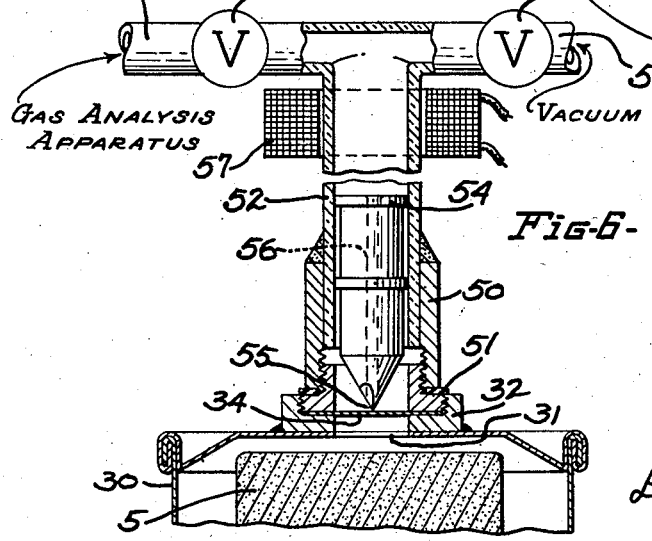
INVENTORS
HERBERT HOOVER JR.
HERBERT E. METCALF
BY
Lippincott & Metcalf
ATTORNEYS.

July 27, 1943.   H. HOOVER, JR., ET AL   2,325,057
MEANS FOR OBTAINING SOIL SAMPLES
Filed May 28, 1940    2 Sheets-Sheet 2
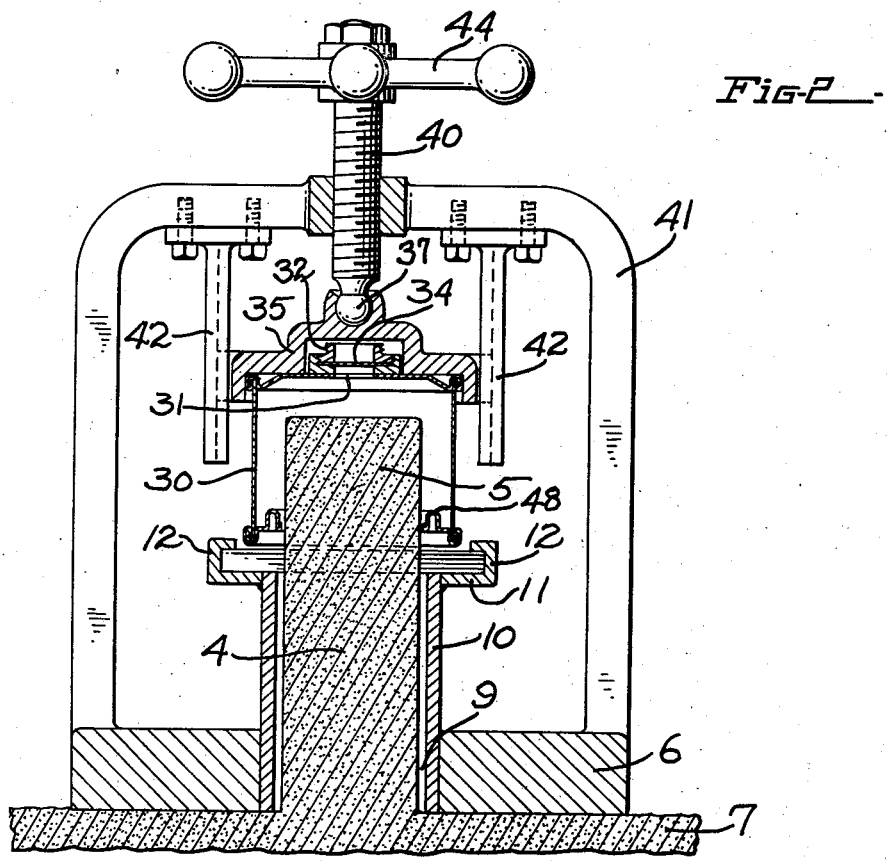
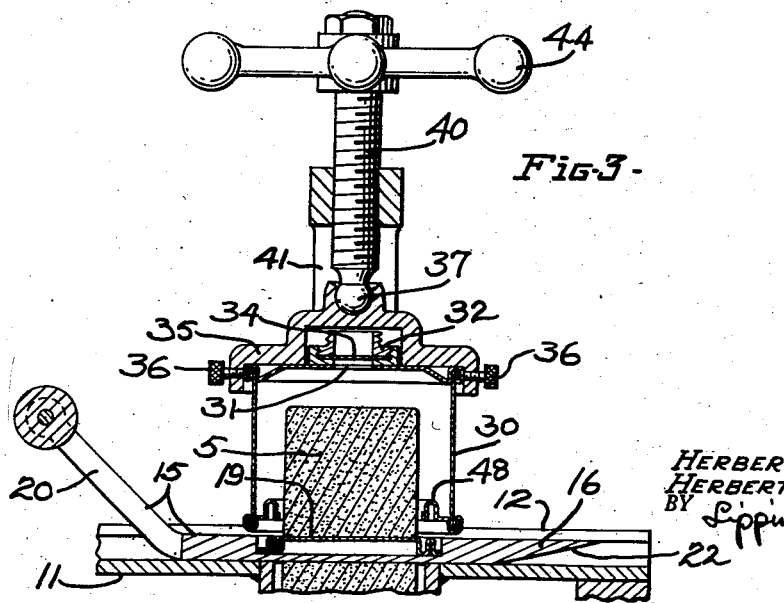
INVENTORS
HERBERT HOOVER JR.
HERBERT E. METCALF
BY Lippincott & Metcalf
ATTORNEYS.

Patented July 27, 1943

2,325,057

UNITED STATES PATENT OFFICE 2,325,057

MEANS FOR OBTAINING SOIL SAMPLES

Herbert Hoover, Jr., Sierra Madre, and Herbert E. Metcalf, San Francisco, Calif., assignors to Consolidated Engineering Corporation, Pasadena, Calif., a corporation of California Application May 28, 1940, Serial No. 337,646

7 Claims. (Cl. 255—1.4)

Our invention relates to a means for obtaining soil samples for use in petroleum prospecting, or for other uses where a minimum disturbance of the sample is desired.

Among the objects of our invention are: To provide an improved means for taking soil samples for use in petroleum prospecting; to provide a means for taking soil samples with a minimum of disturbance of the sample; to provide a means of obtaining a soil sample with a minimum loss of gas therefrom; to provide a means of taking soil samples in sealed containers; to provide a means of taking soil samples, meanwhile retaining a maximum of soil gas; to provide a means of segregating and sealing a soil sample in situ; to provide an improved soil sample container; and to provide a simple and efficient means of obtaining soil samples for petroleum prospecting, or for other purposes where gas contained in the samples is to be analyzed.

Our invention possesses numerous other objects and features of advantage, some of which, together with the foregoing, will be set forth in the following description of specific apparatus.

In the drawings:

Figure 1 is a diagram showing a preliminary step in the taking of soil samples in accordance with our method and with the means herein to be described.

Figure 2 is a view partially in section and partly in elevation of the sampling device positioned to encompass the desired sample.

Figure 3 is an enlarged view of a portion of Figure 2 taken along a section at right angles to the corresponding portion of Figure 2.

Figure 4 is a sectional view showing the action of the cutoff knife.

Figure 5 is an enlarged sectional view of a portion of the cutoff knife carrying the container cover.

Figure 6 is a view partly in section and partly in elevation showing how the filled, sealed sample container is attached to a gas analysis device and punctured to allow escape of gas from the sample.

The word "soil" as used herein is deemed to mean the more loosely consolidated top layers of the earth surface, as distinguished from solid rock.

In petroleum prospecting by soil gas analysis it is customary to procure from the soil a large number of soil samples from systematically located points over an area, these samples being preferably taken at uniform depths and below the water table, or at least at a depth in the ground where the soil is well moist. A record of the locations of the points where these samples are taken, is usually kept on a map of the region covered. After the samples have been gathered, each sample is analyzed to determine whether or not there is present in the soil sample, gas which is significant of the presence of hydrocarbons beneath the area, such gases being, for example, ethane, propane and some of the heavier hydrocarbons. After each analysis has been made the results are referred back to the locations on the map, and the location of an oil or petroleum liquid deposit beneath the area prospected, is determined by correlating the gas content of the various samples.

Such prospecting is being carried on over many areas at the present time, and the customary procedure has been to make a bore hole with a boring tool and to remove from the bottom of the bore hole a certain amount of soil which is then placed in a container. For example, a pint jar may be used which is then sealed to exclude outside air from the sample during its transport to a laboratory for analysis. It is not the intention of this application to theorize over the exact manner in which the gas is contained in the soil, but it is claimed that significant hydrocarbon gas can be obtained from soil samples handled in the above manner.

We have found, however, that anomalous results are obtained if the soil samples are handled differently. For example, if a soil sample is taken from a specific point in the earth with great care taken not to disturb the soil, and another sample is taken as closely as possible to the same point, and this second soil sample disturbed or broken down in the removal thereof before sealing, we have found that the significant hydrocarbons recoverable from the two samples may not be alike. Consequently, sampling over wide areas where uniform care is not taken in the procuring of these samples may give a completely improper correlation because of the loss of gas from the samples during the time which elapses from its actual removal from the ground until it is put into the sealed containers.

It is therefore the main object of our present invention to obtain soil samples with an absolute minimum of disturbance of the soil, with immediate sealing of the sample in situ, so that there will be no chance for gas to escape, or if there may be such chance, the chance will be negligible and uniform throughout the sampled area. In samples taken in this manner we have found that true correlations can be obtained from soil samples taken at or near the same point in the earth, and thus we have been able to preclude in the results obtained, large errors due to non-uniform handling of samples which has heretofore lead to gas losses and anomalous results.

Our invention may be more readily understood by direct reference to the drawings which show a preferred apparatus for accomplishing the method of our invention, whereby a soil sample may be obtained with an absolute minimum of disturbance of the particles thereof, and with substantially instantaneous sealing in situ.

Referring first to Figure 1, we prefer to make a bore hole 1, the size of which is unimportant, in the earth 2 to whatever depth we may desire, the sample being taken in any desired soil which will hold together even if wet and which can be cut by a knife or otherwise severed. In making the hole 1, we leave a central cylindrical projection 4, the top portion 5 of which is to become our desired soil sample. It is obvious that the bore hole 1 may be made with a tool, or by hand if desired, the main care being to assure that the portion 5 be as little disturbed by the making of the bore hole as possible. After the central projection 4 has been defined, a sampling assembly is lowered over the projection 4 as shown in Figure 2.

This sampling assembly comprises a heavy base 6 adapted to rest on the bottom 7 of the bore hole. Base 6 has a central aperture 9 in which is positioned a hollow cylindrical tube 10 which is larger than the central projection 4 of the bore and into which the central projection 4 extends. At the top of the cylinder 10, is positioned a horizontal traverse slide 11 having lateral guides 12 on each side thereof, and in the slide is positioned a sliding knife 15. The sliding knife 15 comprises a base plate 16 having a circular recess 17 therein, in which fits a friction can cover 19 similar to the covers commonly used, for example, on paint cans. The recess 17 is sufficiently deep so that the upper surface of cover 19 lies flush or slightly below the upper surface of the base plate 16.

The knife 15 is provided at one end with a handle 20 and at the other end with a triangular cutting edge 21, this edge 21 being provided with a bevel 22 on its under side as shown in Figure 3. The knife blade can be completely removed from slide 11 at one end, but is limited with respect to its travel in slide 11, by stop pins 24 extending from the bottom of slide 11. It thus can be seen that the knife assembly 15 can be traversed through the slide and that during such traversal, the cutting edge 21 will separate the upper portion 5 of the central soil projection 4 from the remainder of the soil. Stop pins 24 may bear against an unsharpened shoulder at the ends of edge 21.

In order to collect the cutoff soil, we provide a container 30 which may be similar to that used for holding paint, and preferably of pint size.

This container is provided, on what normally would be the bottom thereof, with an aperture 31 surrounded by a threaded projection 32 containing a diaphragm extending across aperture 31. The projection 32 is to be used to attach the sealed container to a gas analysis system as will be described later. The entire container 30 is held in a container head 35 by thumb screws 36. This container head is supported through a ball and socket joint 37 on the end of a screw 40, threaded into a U-frame 41, the sides of which extend upwardly from heavy base 6. The screw 40 is positioned in such a manner that the open end of container 30 receives upper portion 5 of the central soil projection 4 when the entire sampling assembly is positioned on the bottom of the bore hole. The container head 35 is prevented from rotating by guide ways 42, and the screw 40 can be rotated by hand wheel 44.

In operation, the bore hole 1 with its central projection of proper length is made. The container 30 is then placed in container head 35 and the container is lowered by rotating the screw until it just clears the top of knife 15. In this position the portion 5 of the soil is projected into the container 30. The knife is then loaded with the can top 19, and if the soil is friable and of such a character that it might fall into groove 46 of the can top 19, then we prefer to cover the can top with a soil guard sheet 47 which may be, for example, a sheet of tin or aluminum foil, or any other material which is inert as far as significant hydrocarbon is concerned, and hold this foil 47 in position by means of cross-bars 49 on knife 15 so that the surface sliding under the soil sample portion 5, is perfectly smooth.

The knife 15 is then pushed across the slide until it hits stop 24, and during this traversal the knife cuts off portion 5 from the remaining portion 4 with a minimum of disturbance of portion 5. This movement of the knife also brings the can top 19 exactly in register with the friction rim 48 of the container 30. As soon as the sample portion 5 has been cut off, the handle 44 is rotated, thus driving the container downwardly so that the groove 46 of the friction top 19 is forced into proper registry with the container rim 48, thus completely sealing the can. The foil 47 then acts as a sealing gasket.

The sealing may follow the cutoff substantially instantaneously thereby preventing any significant loss of gas from the sample even though the material of the sample be slightly disturbed during the cutoff. It is because we wish minimum disturbance of the sample to take place during the cutoff that we have placed bevel 22 of the knife on the lower side. There is a clearance between the portion 4 of the soil and the cylinder 10, which allows the soil below the knife to be displaced downwardly during passage of the bevel. Whether or not there is a release of gas from the lower portion 4 during this displacement, will, of course be immaterial.

Thus we have collected the sample portion 5 with a minimum of disturbance, and have sealed the sample in situ immediately after cutoff, so that any gas which might be forced out of the material at the time of cutoff is immediately trapped within the container. After the container is sealed the contents of the container may be broken up or handled in any manner desired without loss of gas, as all gas released will remain in the container.

After the container has been sealed it is, of course, labeled and a record made of the location from which it was taken, depth, etc., and the sealed containers may then be taken into the laboratory or field truck for analysis of the contained soil, and attached to the analysis system as shown in Figure 6. Here the end of the analysis system is provided with a fitting 50 which is threaded to projection 36 with a gasket 51 or other sealing device therebetween, this fitting 50 being attached to gas analysis tubing 52. This tubing 52 is preferably vertical and contains an iron weight 54, this weight being provided at its lower end with a sharp point 55, and a hollow bore 56. The weight 54 slides within the vertical tubing 52 and may be lifted with an energized solenoid 57 and then allowed to fall. This falling causes the point 55 to puncture diaphragm 34 sealing the container. Before this puncture takes place, however, we prefer to evacuate tubing 52, through vacuum connection 59, which can be shut off by means of vacuum valve 60 so that gas released from container 30 upon puncture by means of weight 54, may be allowed to pass into gas analysis apparatus inlet 61 under control of valve 62. The gas may be thereupon analyzed for hydrocarbons significant of the presence of petroleum deposits. It is also obvious that the sample 5, either before or after being open to the gas analysis apparatus, may be treated by heat or cold or in other ways to control and release the gas therefrom. Record is kept of the analysis and the results correlated by map plotting as is known in the art.

Thus it will be seen that we have provided a means of taking and sealing soil samples in situ with an absolute minimum of disturbance of the soil particles, thereby preventing loss of gas by disturbance of the soil particles.

It will also be obvious that our invention can be applied to any soil wet or dry which will keep itself in shape for a sufficient length of time for the sample to be cut off and sealed.

It is also to be understood that our invention can be applied to a search for valuable subterranean deposits other than petroleum where the loss of substances from such soil samples and significant of said subterranean deposits is to be precluded. Other valuable subterranean mineral deposits to which our invention is applicable includes coal, helium, or natural gas.

We claim:

1. Apparatus for collecting a soil sample without substantially disturbing the contents thereof, which comprises a body member having an aperture for admitting a substantially rigid preformed soil column, a container holder secured to said body, alined with the axis of said aperture, and adapted to position a container around a free end of said soil column, guides supported by said body member transverse to said axis, cutting means transversely movable in said guides and adapted to sever a portion of said soil from the end of said soil column, said portion being of such size as to readily fit into said container.

2. Apparatus according to claim 1 wherein said cutting means has a recess therein adapted to hold a cover complementary to said container, and means adapted to move said container holder parallel to said axis and to press said container onto said container cover to form an air tight seal.

3. Apparatus according to claim 1 wherein said cutting means has a recess therein adapted to hold a cover complementary to said container, and which comprises registering means secured to said body member and cooperating with said cutting means to position said cover in a registering position with respect to said container, and means to move said container holder to press said container and said cover together to seal a severed soil portion from air contamination.

4. Apparatus for collecting a soil sample without substantially disturbing the contents thereof which comprises a body member having an aperture for admitting a substantially rigid preformed soil column, a container holder secured to said body, alined with said aperture and adapted to position a removable container around a free end of said soil column, cutting means associated with said holder for severing a portion of said soil from the end of said soil column, said severed portion being of such size as to readily fit into said container, and a cover for such container carried by said cutting means.

5. A soil sample container comprising a cylindrical body, means at one end of said body adapted to receive a sealing cover, a plate at the other end thereof having an aperture therein, a collar secured to said plate around said aperture and having a threaded portion, a second threaded collar cooperating with said first collar to hold a sealing membrane in sealing relation to the bore of said first collar.

6. A soil sample container comprising an envelope having first and second openings therein, a collar secured to said container around one of said openings, means for maintaining an impermeable membrane sealing in relationship to the bore of said collar, and means for sealing the other of said openings, whereby said envelope, said membrane and said sealing means form a closed airtight space.

7. In combination a container having an open end, said container encompassing the top of a preformed substantially undisturbed portion of soil attached to a main soil body, means for sliding a cover between said main body and said encompassed portion with a lateral movement until the open end of said container and said cover register, and means for sealing said cover on said container.

HERBERT HOOVER, Jr.
HERBERT E. METCALF.